Dec. 17, 1957 H. E. POWELL 2,816,474
INSPECTING INTERIOR OF TELEVISION TUBE FACE
Filed June 30, 1953
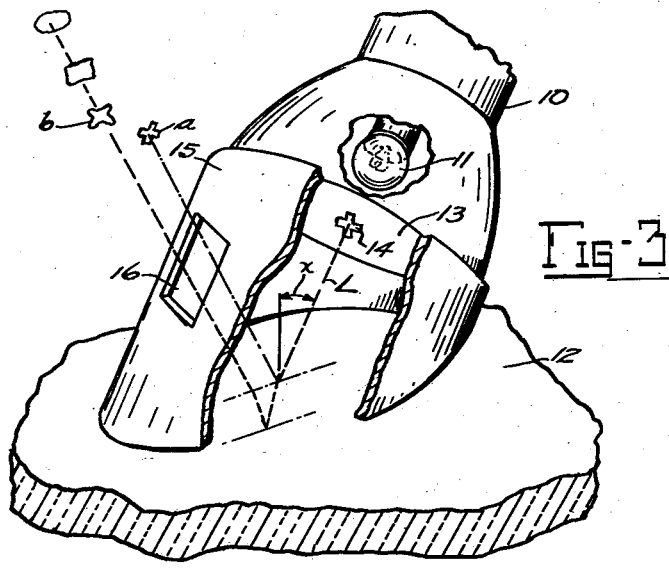
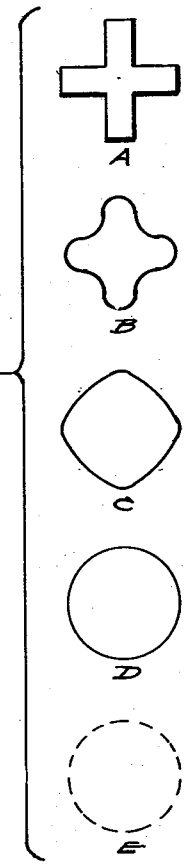
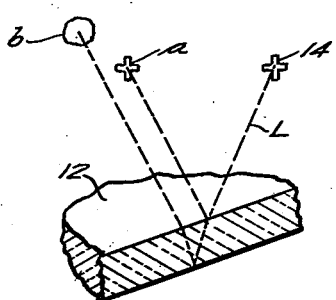
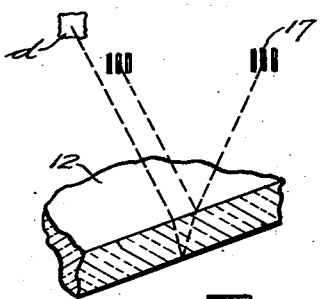
INVENTOR
HOMER E. POWELL
BY
ATTORNEYS

United States Patent Office 2,816,474
Patented Dec. 17, 1957

2,816,474

INSPECTING INTERIOR OF TELEVISION TUBE FACE

Homer E. Powell, Maumee, Ohio, assignor to Owens-Illinois Glass Company, a corporation of Ohio Application June 30, 1953, Serial No. 365,177

2 Claims. (Cl. 88—14)

This invention relates to inspecting the faces of cathode ray tubes and particularly to a method for inspecting the faces of television tubes.

In the manufacture of television tubes of glass, the tube is made in various component parts which are sealed together. These parts include a face plate and a funnel. More recently the inside surface of the face plate has been treated or formed with microscopic or nodular protuberances in order to eliminate the reflection from external light sources which interferes with the viewer's vision of the television picture. This problem of reflection has become more critical and severe with the development of larger size television tubes particularly those wherein the face plate has a spherical curvature. The microscopic protuberances have been given the term "stipples" or "stippling." Various means have been devised and suggested for measuring the degree of stippling applied to the face plate. Each of these devices requires the measurement to be taken prior to sealing the face plate to the funnel. Where it is required to inspect the face plate of an assembled tube, it has been necessary to break the tube in order to expose the stippled surface for inspection.

It is therefore an object of this invention to provide a quick and easy method for inspecting the stippled surface of a television tube either before or after the face plate has been sealed to the funnel.

It is a further object of this invention to provide such a method which does not require breaking the tube.

Other objects of the invention will appear hereinafter.

Basically the invention comprises directing a light beam of specified configuration at an acute angle onto one surface of the face plate and through the plate to the second surface, causing two images to be reflected from the face plate, one from each of the surfaces. Visual comparison of the two images indicates the relative amount of stippling and therefore the effectiveness of the stippling in reducing the reflection from external light sources.

Referring to the accompanying drawings:

Fig. 1 is a fragmentary isometric view of an apparatus embodying the invention in inspecting position relative to a glass face plate;

Fig. 2 is a diagrammatic view of the light path in one form of the invention;

Fig. 3 shows a series of cross-sections of the light beam; and

Fig. 4 is a diagrammatic isometric view of the light path in a modified form of the invention.

Referring to Fig. 1, a source of light such as a flashlight 10 with a bulb 11 is provided to direct a light beam of predetermined cross-sectional configuration against the surface of a glass face plate 12, as presently described.

A thin opaque disk 13 is placed over the end of the flashlight, and is provided with an aperture 14. The aperture is preferably in the form of a cross or X, but may have other configurations as hereinafter described. The bulb is preferably coated with a diffusing coating or a diffusing material is placed between the bulb and aperture, in order to provide a uniformly illuminated surface over the area of the aperture.

Tube 15 is provided on the end of the flashlight with its axis concentric with the axis of the flashlight. The base of the tube is cut at an angle such that the axis of the tube forms an acute angle $x$ with the vertical. This angle $x$ is preferably 45° in order that the images formed by the light beam will not overlap. In practice, I have found that this angle may vary from 70° to 20°.

The tube is preferably painted black or made of a dark material in order that there will be maximum contrast. In addition the tube is provided with a window 16 at an angle of approximately 45° with the normal to the face plate in order that the reflected images may be easily viewed. The tube may be made of various materials such as cardboard or Transite. A heat resistant material such as Transite will permit use of the apparatus on hot face plates.

The beam of light L, directed through the aperture to the glass surface, causes an image $a$ to be reflected from the first or exterior surface of the glass plate. A portion of the beam is refracted through the plate and an image $b$ is reflected from the second or interior surface of the glass plate. Under normal conditions the second surface of the glass plate would be the surface which is stippled. The stippling causes a diffusion of the light and the resultant image $b$ which is reflected is distorted and not as distinct. The degree of stippling determines the amount of diffusion or distortion of the image reflected from the second surface. A visual comparison of the two reflections, $a$ and $b$, as viewed through the window 16, permits a quick and easy determination of the degree of stipple.

In the example shown wherein the light beam L has a cross-sectional configuration of a cross, the image reflected from the second surface might appear as any one of the cross-sections shown in Fig. 3. If there were no stippling on the second surface, the cross would be undistorted as shown in A. A slight stipple would distort the cross by rounding off the sharp corners in the manner shown in B. Greater stippling would cause the light beam to take the configuration shown in C or D. A great degree of stippling causes the major portion of the light beam to be diffused and the faint and almost indefinable image would be observed as shown in E.

In practice, it can be decided which degree of stipple is acceptable and any face plate which shows an image less distorted than the selected standard may be rejected. For example, if it were decided that a stippling of the degree shown in D in Fig. 3 was desired, any face plate producing images of less distortion, such as A, B, and C, in Fig. 3, would be unacceptable and would be rejected.

It should be noted that an analysis of the stipple will be made difficult, if not impossible, by any film of moisture or any other transparent substance or material which covers the stipples and produces a smooth reflecting air-substance interface in place of the stippled air-glass interface.

Although the invention has been described as utilizing a light beam having a cross-sectional configuration of a cross or X, it is apparent that light beams of other configurations might also be used, wherein the light beam has specifically defined limits which would permit a ready determination of any distortion thereof.

I have determined that the configuration of the aperture preferably comprises a series of straight sides connected to each other at angles of substantially 90°.

One example of a modified light beam is shown in Fig. 4 wherein the aperture 17 consists of a series of thin slits projecting three separate light beams against the glass surface being inspected. Presence of stippling causes the images to be diffused producing a blurred or single image as shown by image *d*.

The method as shown and described may be used on face plates before or after the face plate has been sealed to the funnel of the television tube. In addition the method may also be used to inspect the face plate even after the phosphor coating has been applied to the inner surface of the face plate or after the entire tube has been assembled with its electronic parts.

Modifications may be resorted to within the spirit and scope of the appended claims.

I claim:

1. The method of inspecting the interior stippled surface of the face plate in a television tube after the face plate has been sealed to the funnel of the television tube, the exterior surface of the face plate being smooth, which method comprised directing a light beam of predetermined cross-sectional configuration including straight sides from the exterior against said smooth exterior surface at an acute angle and controlling the cross sectional size of said beam and the size of said acute angle in such a manner that said beam is reflected from said face plate as two independent non-overlapping portions, one said portion being reflected from the exterior surface of said face plate and having its cross-sectional configuration substantially undistorted, the other said portion being reflected from the interior surface of the face plate back through said face plate and having its cross-sectional configuration distorted in proportion to the degree of stippling on the interior surface.

2. The method of inspecting the interior stippled surface of the face plate in a television tube after the face plate has been sealed to the funnel of the television tube, the exterior surface of the face plate being smooth, which method comprises directing a light beam of predetermined cross-sectional configuration including straight sides from the exterior surface at an angle of approximately 45° and controlling the cross sectional size of said beam in such a manner that said beam is reflected from said face plate as two independent non-overlapping portions, one said portion being reflected from the exterior surface of said face plate and having its cross-sectional configuration substantially undistorted, the other said portion being reflected from the interior surface of the face plate back through said face plate and having its cross-sectional configuration distorted in proportion to the degree of stippling on the interior surface.

References Cited in the file of this patent

UNITED STATES PATENTS

| | | |
|---|---|---|
| 1,503,543 | Lytle | Aug. 5, 1924 |
| 1,671,709 | Gallasch | May 29, 1928 |
| 1,756,785 | Gallasch | Apr. 29, 1930 |
| 1,875,665 | Schweizer | Sept. 6, 1932 |
| 2,015,730 | Rosin et al. | Oct. 1, 1935 |
| 2,253,054 | Tuttle et al. | Aug. 19, 1941 |
| 2,604,809 | Mitchell | July 29, 1952 |

FOREIGN PATENTS

| | | |
|---|---|---|
| 395,649 | Great Britain | July 20, 1933 |

OTHER REFERENCES

Hunter: "Methods of determining gloss," pages 19–39 in Journal of Research of the National Bureau of Standards, volume 18, January 1937, page 35.

Scientific American, page 178 of the October 1946 issue.